United States Patent
Sowul et al.

(10) Patent No.: US 7,172,525 B2
(45) Date of Patent: Feb. 6, 2007

(54) ELECTRICALLY VARIABLE TRANSMISSION HAVING A MECHANICAL REVERSE MODE

(75) Inventors: Henryk Sowul, Novi, MI (US); James D. Hendrickson, Belleville, MI (US); Tejinder Singh, Canton, MI (US)

(73) Assignees: General Motors Corporation, Detroit, MI (US); DaimlerChrysler Corporation, Auburn Hills, MI (US)

( * ) Notice: Subject to any disclaimer, the term of this patent is extended or adjusted under 35 U.S.C. 154(b) by 195 days.

(21) Appl. No.: 11/040,642

(22) Filed: Jan. 21, 2005

(65) Prior Publication Data

US 2006/0019784 A1   Jan. 26, 2006

Related U.S. Application Data

(60) Provisional application No. 60/590,423, filed on Jul. 22, 2004.

(51) Int. Cl.
*F16H 3/72* (2006.01)
(52) U.S. Cl. .......................................................... 475/5
(58) Field of Classification Search ................... 475/5, 475/280, 282
See application file for complete search history.

(56) References Cited

U.S. PATENT DOCUMENTS

| | | | |
|---|---|---|---|
| 5,558,595 A | 9/1996 | Schmidt et al. | 477/3 |
| 5,730,676 A * | 3/1998 | Schmidt | 475/5 |
| 5,931,757 A | 8/1999 | Schmidt | 475/2 |
| 6,478,705 B1 | 11/2002 | Holmes et al. | 475/5 |
| 6,527,658 B2 | 3/2003 | Holmes et al. | 475/5 |
| 7,059,986 B2 * | 6/2006 | Schmidt | 475/5 |
| 2004/0058769 A1 * | 3/2004 | Larkin | 475/5 |

* cited by examiner

*Primary Examiner*—Ha Ho
(74) *Attorney, Agent, or Firm*—Christopher DeVries

(57) ABSTRACT

An electrically variable transmission having two planetary gear sets, two motor/generators, and six torque transfer devices to provide input split, compound split, output split, neutral, electric reverse and mechanical reverse modes of operation. The electrically variable transmission includes: an input member to receive power from an engine; an output member; first and second motor/generators; and first and second differentially geared planetary gear sets each having first, second and third gear members. The input member is not continuously connected with any member of the planetary gear sets, and the output member is continuously connected to the first member of the second planetary gear set. The first and second motor/generators are each continuously connected to at least one member of the planetary gear sets. The first member of the first planetary gear set is continuously connected with the third member of the second planetary gear set. The six torque transfer devices are selectively engageable to provide the various operating modes of the electrically variable transmission.

15 Claims, 2 Drawing Sheets

| REVERSE |
|---|
| CL1 - OFF |
| CL2 - APPLY |
| CL3 - OFF |
| CL4 - APPLY |
| CL5 - APPLY |
| CL6 - OFF |

| FWD (2nd FIXED) |
|---|
| CL1 - APPLY |
| CL2 - APPLY |
| CL3 - OFF |
| CL4 - OFF |
| CL5 - OFF |
| CL6 - APPLY |

| REVERSE | |
|---|---|
| CL1 | - OFF |
| CL2 | - APPLY |
| CL3 | - OFF |
| CL4 | - APPLY |
| CL5 | - APPLY |
| CL6 | - OFF |

| FWD (2nd FIXED) | |
|---|---|
| CL1 | - APPLY |
| CL2 | - APPLY |
| CL3 | - OFF |
| CL4 | - OFF |
| CL5 | - OFF |
| CL6 | - APPLY |

ELECTRICALLY VARIABLE TRANSMISSION HAVING A MECHANICAL REVERSE MODE

CROSS-REFERENCE TO RELATED APPLICATIONS

This application claims the benefit of U.S. Provisional Application No. 60/590,423, filed Jul. 22, 2004, which is hereby incorporated by reference in its entirety.

TECHNICAL FIELD

The present invention relates to an electrically variable transmission having two planetary gear set, two motor/generators and six torque transfer devices.

BACKGROUND OF THE INVENTION

Internal combustion engines, particularly those of the reciprocating piston type, currently propel most vehicles. Internal combustion engines are relatively efficient, compact, lightweight, and inexpensive mechanisms by which to convert fossil fuel into useful mechanical power, so they are very suitable for vehicle propulsion. A novel transmission system which can reduce emissions and fuel consumption when used with internal combustion engines may be of great benefit to the public.

The flexibility with which reciprocating piston internal combustion engines operate poses challenges. Typically, a vehicle is propelled by such an engine, which is started from a cold state by a small electric motor and relatively small electric storage batteries, then quickly placed under the load of effecting propulsion and operating accessory equipment. Such an engine is also operated through a wide range of speeds and a wide range of loads and typically at a fifth of its maximum power. These wide ranges of engine operation require that clean, efficient combustion be maintained through extremes in operating conditions—an elusive goal.

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary, and clutches or torque converters that allow smooth transitions between driving ratios to start the vehicle from rest and accelerate to the desired highway speed with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. A series electric drive suffers from the weight of the electric machinery necessary to transform all engine power from mechanical to electrical and from electrical to mechanical, and from the useful power lost in this double conversion.

A power split transmission can use what is commonly understood to be a "differential gearing" to achieve a continuously variable torque and speed ratio between input and output without sending all power through the variable elements. An electrically variable transmission can use differential gearing to send a fraction of its transmitted power through a pair of electric motor/generators and the remainder of its power through another, parallel path that is all mechanical and direct, of fixed ratio, or alternatively selectable. One form of differential gearing, as is well known to those skilled in this art, may constitute a planetary gear set. In fact, planetary gearing is usually the preferred embodiment employed in differentially geared inventions, with the advantage of compactness and different torque and speed ratios among all members of the planetary gearing set. However, it is possible to construct this invention without planetary gears, as by using bevel differential gears or other differential gears.

For example, a set of bevel differential gears found in a typical automobile axle consists of three or four bevel pinions on a carrier and a meshing bevel gear for each axle. To replace the first set of planetary gearing in the first embodiment of the invention, the carrier of a first set of bevel differential gears would be connected to the input, one bevel gear that would normally be connected to an axle would instead be connected to the first motor, and the other such bevel gear would be connected to the central shaft. Bevel differential gears could likewise replace the second set of planetary gearing, and so the invention could be embodied without any planetary gears.

A hybrid electrically variable transmission system for a vehicle also includes an electric storage battery, which allows the mechanical output power to vary from the mechanical input power, engine starting with the transmission system and regenerative vehicle braking.

An electrically variable transmission in a vehicle can simply transmit mechanical power. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

One of the most successful substitutes for the series hybrid transmission is the variable, two-mode, input-split, parallel, hybrid electric transmission. Such a transmission utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

Operation in a first or second mode may be selectively achieved by using clutches in the nature of torque transfer devices. In one mode the output speed of the transmission is proportional to the speed of one motor/generator, and in the second mode the output speed of the transmission is generally proportional to the speed of the other motor/generator.

In some embodiments of the variable, two-mode, input-split, parallel, hybrid electric transmission a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

Accordingly, there is a need in the art for a large horsepower transmission system which provides maximum power with little additional power provided by the electric storage device. It is also desirable to enhance overall efficiency at high output speeds. These objectives can be achieved by a two-mode, compound-split, electromechanical transmission that provides the desired high efficiency sought for continuous, constant-speed operation as well as high-average power applications.

U.S. Pat. No. 6,527,658, issued Mar. 4, 2003 to Holmes et al, and commonly assigned with the present application, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, providing input power split or compound power split modes of operation, and one fixed ratio is available. A "fixed ratio" is an operating condition in which no power flows through the motor/generators to minimize losses.

U.S. Provisional Patent Application Ser. No. 60/590,427, to Holmes et al, filed Jul. 22, 2004, entitled "Electrically Variable Transmission with Selective Fixed Ratio Operation," commonly assigned with the present application, and hereby incorporated by reference, discloses an electrically variable transmission having two planetary gear sets, two motor/generators, and three, four or fives torque transfer devices to provide input split, compound split, output split, neutral and electric reverse modes of operation.

SUMMARY OF THE INVENTION

The present invention provides an electrically variable transmission having two planetary gear sets, two motor/generators, and six torque transfer devices to provide input split, compound split, output split, neutral, electric reverse and mechanical reverse modes of operation.

Specifically, an electrically variable transmission in accordance with the invention includes: an input member to receive power from an engine; an output member; first and second motor/generators; and first and second differentially geared planetary gear sets each having first, second and third gear members. The input member is not continuously connected with any member of the planetary gear sets, and the output member is continuously connected to the first member of the second planetary gear set. The first and second motor/generators are each continuously connected to at least one member of the planetary gear sets. The first member of the first planetary gear set is continuously connected with the third member of the second planetary gear set. A first torque transfer device selectively grounds the second member of the second planetary gear set. A second torque transfer device selectively connects the second member of the second planetary gear set to the second member of the first planetary gear set. A third torque transfer device selectively grounds the third member of the second planetary gear set. A fourth torque transfer device selectively connects the first member of the first planetary gear set with the input shaft. A fifth torque transfer device selectively grounds the third member of the first planetary gear set. A sixth torque transfer device selectively connects the third member of the first planetary gear set with the input shaft.

In one embodiment, the first, second and third members of the first planetary gear set are implemented as a carrier, sun gear and ring gear, respectively, and the first, second and third members of the second planetary gear set are implemented as a carrier, ring gear and sun gear, respectively. In this embodiment, the first planetary gear set is a compound planetary gear set, and the second planetary gear set is a simple planetary gear set.

In another embodiment, the first, second and third members of the first planetary gear set are implemented as a ring gear, sun gear and carrier, respectively, and the first, second and third members of the second planetary gear set are implemented as a carrier, ring gear and sun gear, respectively. In this embodiment, the first and second planetary gear sets are simple planetary gear sets.

In either embodiment, the mechanical reverse mode is achieved with the engagement of the second, fourth and fifth torque transfer devices.

In the embodiments shown herein, the first motor/generator is continuously connected to the second member of the first planetary gear set and selectively connected to the second member of the second planetary gear set, and the second motor/generator is continuously connected with the third member of the second planetary gear set. However, the first and second motor/generators may be connected to different members of the planetary gear sets within the scope of the present invention.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1a shows a schematic lever diagram of an electrically variable transmission in accordance with a first embodiment of the invention;

FIG. 1b shows a clutching table for a reverse mode of operation of the transmission shown in FIG. 1a;

FIG. 1c shows a clutching table for a forward fixed ratio mode of operation of the transmission of FIG. 1a;

FIG. 2a shows a schematic lever diagram of an electrically variable transmission in accordance with an alternative embodiment of the invention;

FIG. 2b shows a clutching table corresponding with a reverse mode of the transmission shown in FIG. 2b; and FIG. 2c shows a clutching table for a forward fixed ratio of operation of the transmission shown in FIG. 2a.

DESCRIPTION OF THE PREFERRED EMBODIMENTS

Figures 1A, 1B, 1C:
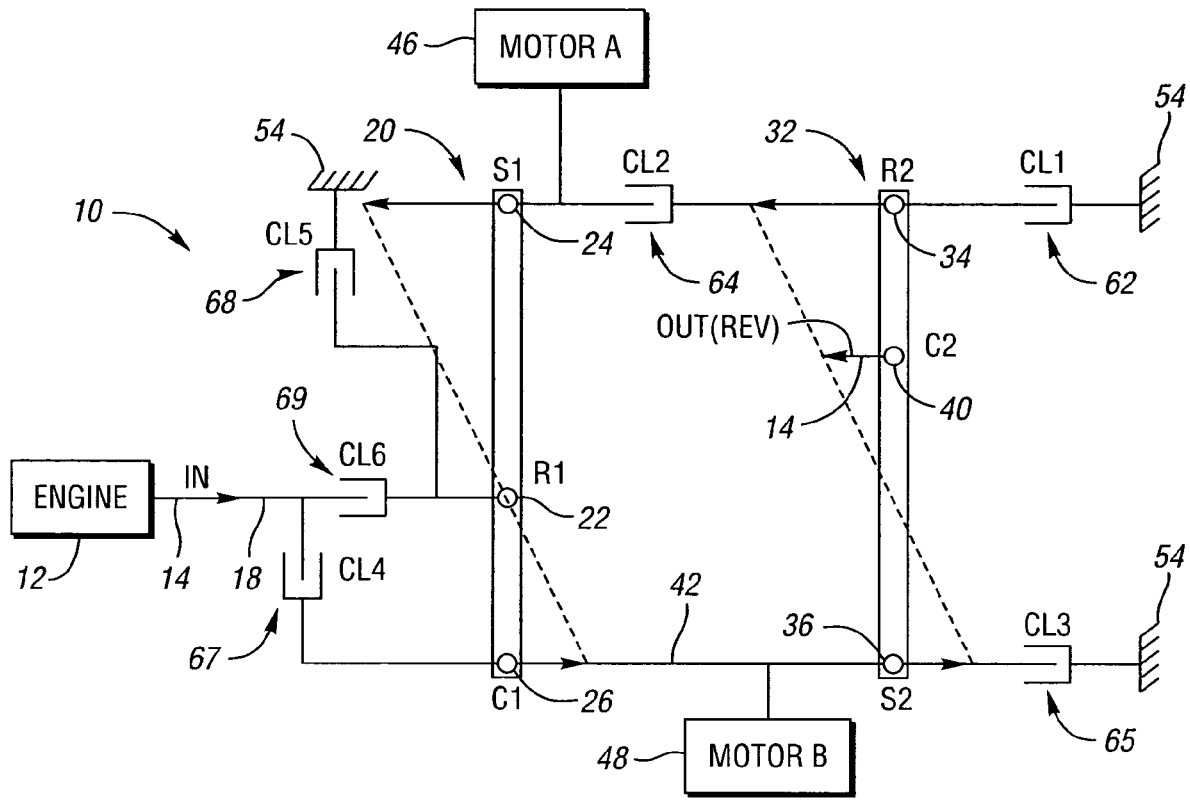

With particular reference to FIG. 1a, one preferred embodiment of the improved electrically variable transmission is designated generally by the numeral 10. The transmission 10 is designed to receive at least a portion of its driving power from an engine 12. As shown, the engine 12 has an output shaft 14 that may also serve as the forward input member of a transient torque damper (not shown). The optional transient torque damper is connected to the input member 18 of the transmission 10.

In the embodiment depicted, the engine 12 may be a fossil fuel engine, such as a diesel engine which is readily adapted to provide its available power output typically delivered at a constant number of revolutions per minute (rpm).

Irrespective of the means by which the engine 12 is connected to the transmission input member 18, the transmission input member 18 is operatively connectable to the planetary gear set 20 of the transmission 10.

The transmission 10 utilizes two planetary gear sets. The first planetary gear set 20 includes a ring gear 22, a sun gear 24, and a carrier 26. The first planetary gear set 20 is a compound planetary gear set in that the carrier 26 supports a plurality of pairs of planet gears which are respectively engaged with the sun gear 24, ring gear 22, and with each other.

The second planetary gear set 32 is a simple planetary gear set, and includes a ring gear member 34 that circumscribes a sun gear member 36. A carrier 40 rotatably supports a plurality of planet gears which are each simultaneously meshingly engaged with both the ring gear member 34 and the sun gear member 40.

The planetary gear sets 20, 32 are further compounded by the continuous connection between the carrier 26 of the first planetary gear set 20 and the sun gear 36 of the second planetary gear set 32 via the interconnecting shaft 42.

The first preferred embodiment also incorporates first and second motor/generators 46 and 48, respectively. The first motor/generator 46 is shown connected to the sun gear 24 of the first planetary gear set, and the second motor/generator 48 is shown connected to the sun gear 36 of the second planetary gear set 32. However, the invention contemplates that the motor/generators 46, 48 may be connected in a variety of locations on the transmission 10.

The ring gear 34 of the second planetary gear set 32 is selectively grounded to the housing 54, as by a first clutch means in the nature of a torque transfer device 62 (CL1). That is, the grounded ring gear 34 is selectively secured against rotation by an operative connection to the non-rotatable housing 54. The ring gear 34 of the second planetary gear set 32 is also selectively connected to the sun gear 24 of the first planetary gear set 20, as by a second clutch means in the nature of a torque transfer device 64 (CL2). The first and second torque transfer devices 62 and 64 are employed to assist in the selection of the operational modes of the hybrid transmission 10. A third torque transfer device 65 (CL3) selectively connects the sun gear 36 of the planetary gear set 32 to the transmission housing 54.

Accordingly, this torque transfer device 65 allows the second motor generator 48, which is also connected to the sun gear 36, to be locked to the transmission housing 54.

A fourth torque transfer device 67 (CL4) is operative as a reverse input clutch in that it selectively connects the input shaft 18 with the carrier 26 of the first planetary gear set 20. A fifth torque transfer device 68 (CL5) selectively connects the ring gear 22 of the first planetary gear set 20 to the transmission housing 54. A sixth torque transfer device 69 (CL6) is operative as an input clutch in that it selectively connects the input shaft 18 with the ring gear 22 of the first planetary gear set 20.

The output member 14 of the transmission 10 may present peripheral gear teeth meshingly to engage a transfer gear. This configuration may be used with a front wheel drive or a rear wheel drive vehicle. It should also be appreciated that the output 14 could transfer output power to the transfer case by a chain drive or other similar mechanical connection.

Returning now to the description of the power sources, it should be apparent that the transmission 10 receives power from the engine 12. However, the hybrid transmission also receives power from an electric power source, such as a battery, which is connected to the motor/generators 46, 48. Other electric power sources, such as fuel cells, that have the ability to provide, or store, and dispense electric power may be used in place of batteries without altering the concepts of the present invention.

The above-described hybrid transmission provides a continuously variable transmission arrangement having input slit, compound split, neutral, electrical reverse, and mechanical reverse modes of operation. It also provides four fixed ratios of operation for improved efficiency.

The chart of FIG. 1b illustrates the clutching arrangement necessary for a mechanical only operation of the transmission 10. As shown, for mechanical only reverse operation, the torque transfer device is 64 (CL2), 67 (CL4), and 68 (CL5) are applied while the remaining torque transfer devices are disengaged. Accordingly, the input 18 is connected to the carrier 26, and the representative lever of the first planetary gear set 20 pivots about the fixed ring gear 22 so that the sun gear 24 moves the distance indicated by the corresponding arrow in the lever diagram of FIG. 1a. Since the sun gear 24 is connected to the ring gear 34 by the torque transfer device 64, and the carrier 26 is connected to the sun gear 36 by the interconnecting member 42, the carrier 40, which is connected to the output 14, which is of the transmission 10, is caused to move in the reverse direction, as indicated by the arrow on line 14, which is representative of the output shaft.

The chart of FIG. 1c illustrates the clutching engagements for a second forward fixed ratio of the transmission of FIG. 10 wherein the transmission is operated mechanically only (i.e., no power is transmitted through the motor/generators 46, 48). As illustrated, the torque transfer devices 62 (CL1), 64 (CL2) and 69 (CL6) are applied while the remaining torque transfer devices are disengaged. Accordingly, the ring gear 22 is connected to the input shaft 18 and the sun gear 24 and ring gear 34 are grounded. The net result is a fixed forward ratio for the carrier 40, which is connected to the output 14 of the transmission. Accordingly, a fixed ratio is achieved.

General Operating Considerations

One of the primary control devices is a well known drive range selector (not shown) that directs a conventional electronic control unit (the ECU) to configure the transmission for either the park, reverse, neutral, or forward drive range.

The second and third primary control devices constitute an accelerator pedal (not shown) and a brake pedal (also not shown). The information obtained by the ECU from these three primary control sources is designated as the "operator demand." The ECU also obtains information from a plurality of sensors (input as well as output) as to the status of: the torque transfer devices (either applied or released); the engine output torque; the unified battery, or batteries, capacity level; and the temperatures of selected vehicular components. The ECU determines what is required and then manipulates the selectively operated components of, or associated with, the transmission appropriately to respond to the operator demand.

The invention uses both simple and compound planetary gear sets. In a simple planetary gear set a single set of planet gears are normally supported for rotation on a carrier that is itself rotatable.

In a simple planetary gear set, when the sun gear is held stationary and power is applied to the ring gear of a simple planetary gear set, the planet gears rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the planet carrier, and the ring gear are known, then the speed of the third member can be determined using a simple rule. The rotational speed of the carrier is always proportional to the speeds of the sun and the ring, weighted by their respective numbers of teeth. For example, a ring gear may have twice as many teeth as the sun gear in the same set. The speed of the carrier is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier, and the ring gear can also be simply related to one another if this is done without consideration of the masses of the gears, the acceleration of the gears, or friction within the gear set, all of which have a relatively minor influence in a well-designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier must be equal in magnitude and opposite in direction to the sum of the torque on the sun gear and the torque on the ring gear.

In a compound planetary gear set, the utilization of inner and outer sets of planet gears effects an exchange in the roles of the ring gear and the planet carrier in comparison to a simple planetary gear set. For instance, if the sun gear is held stationary, the planet carrier will rotate in the same direction as the ring gear, but the planet carrier with inner and outer sets of planet gears will travel faster than the ring gear, rather than slower.

In a compound planetary gear set having meshing inner and outer sets of planet gears the speed of the ring gear is proportional to the speeds of the sun gear and the planet carrier, weighted by the number of teeth on the sun gear and the number of teeth filled by the planet gears, respectively. For example, the difference between the ring and the sun filled by the planet gears might be twice as many teeth as are on the sun gear in the same set. In that situation the speed of the ring gear would be the sum of two-thirds the speed of the carrier and one third the speed of the sun. If the sun gear or the planet carrier rotates in an opposite direction, the arithmetic sign is negative for that speed in mathematical calculations.

If the sun gear were to be held stationary, then a carrier with inner and outer sets of planet gears will turn in the same direction as the rotating ring gear of that set. On the other hand, if the sun gear were to be held stationary and the carrier were to be driven, then planet gears in the inner set that engage the sun gear roll, or "walk," along the sun gear, turning in the same direction that the carrier is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier. The effect of the rotation of the pinion gears in the outer set on their own axis and the greater effect of the orbital motion of the planet gears in the outer set due to the motion of the carrier are combined, so the ring rotates in the same direction as the carrier, but not as fast as the carrier.

If the carrier in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier supporting a single set of planet gears will rotate with less speed and in the same direction as the sun gear. Thus, one can readily observe the exchange in roles between the carrier and the ring gear that is caused by the use of inner and outer sets of planet gears which mesh with one another, in comparison with the usage of a single set of planet gears in a simple planetary gear set.

The normal action of an electrically variable transmission is to transmit mechanical power from the input to the output.

As part of this transmission action, one of its two motor/generators acts as a generator of electrical power. The other motor/generator acts as a motor and uses that electrical power. As the speed of the output increases from zero to a high speed, the two motor/generators gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, an electric storage battery may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Description of a Second Exemplary Embodiment

Figures 2A, 2B, 2C:
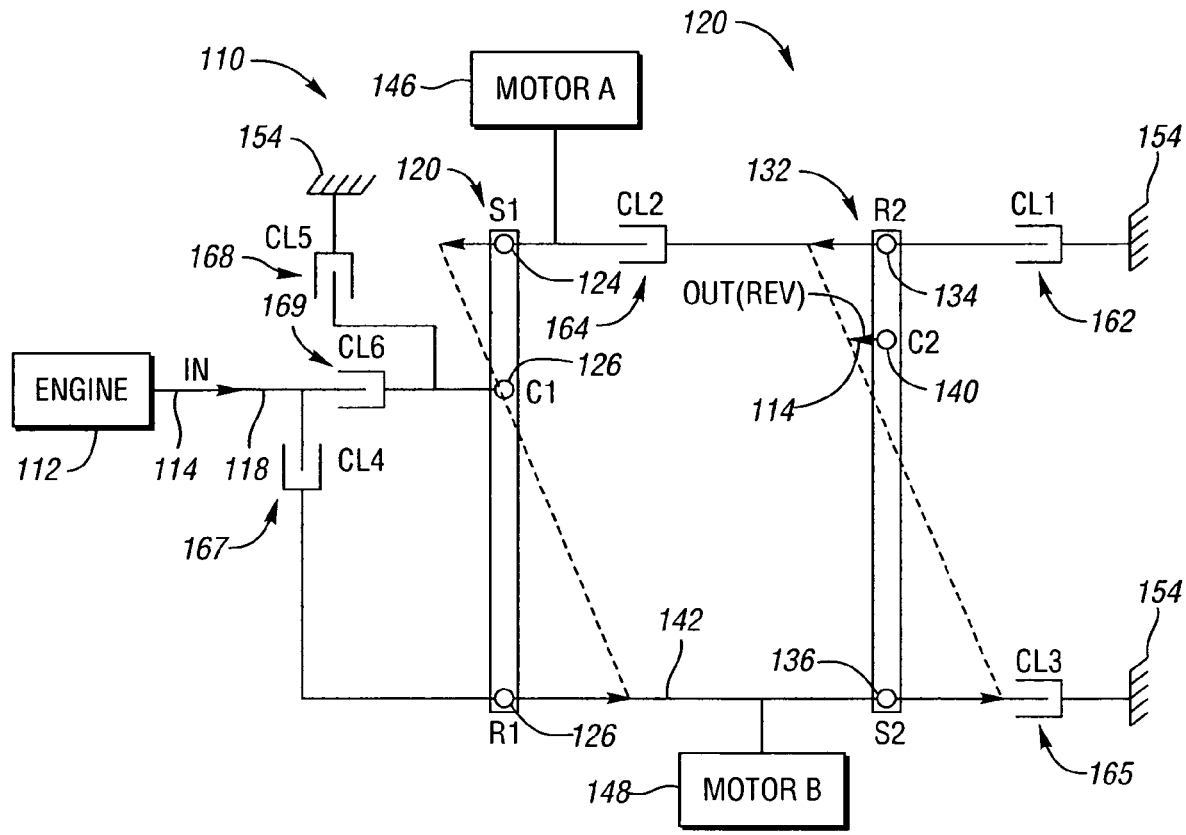

With particular reference to FIGS. 2a–c, an alternative embodiment of the improved electrically variable transmission is identified generally by the designation 110. The operating components of the transmission of FIG. 2a are substantially similar to those of the transmission of FIG. 1a, so like reference numerals are used to refer to like components from FIGS. 1a and 2a. In FIG. 2a, both planetary gear sets 120, 132 are simple planetary gear sets, as opposed to the compound arrangement of the transmission of FIG. 1a.

The transmission 110 of FIG. 2a may, in part, receive its input power from an engine 112. The embodiment depicted, the engine 112 may also be a fossil fuel engine, such as a diesel engine which is readily adapted to provide its available power output typically delivered at a constant number of revolutions per minute (rpm). As shown, the engine 112 has an output shaft 114 that may also serve as the forward input member of an optional transient torque damper (not shown). The output member of the transient torque damper serves as an input member 118 to the transmission 110.

The transmission 110 utilizes two planetary gear sets. The first planetary gear set 120 is a simple planetary gear set which employs an outer ring gear 122 which circumscribes an inner sun gear 124. A carrier assembly 126 rotatably supports pinion gears which meshingly engage both the sun gear 124 and ring gear 122.

The second planetary gear set 132 is also a simple planetary gear set which includes an outer ring gear 134 circumscribing an inner sun gear member 136. A carrier assembly 140 rotatably support pinion gears which are meshingly engaged with both the ring gear 134 and the sun gear 136.

The first and second planetary gear sets 120, 130 are compounded in that the sun gear 136 of the second planetary gear set is conjoined, as through a central shaft 142, to the ring gear 122 of the first planetary gear set 120.

The second preferred embodiment 110 also incorporates first and second motor/generators 146 and 148, respectively. As shown, the motor/generator 146 is connected to the sun gear 124 of the first planetary gear set 120, and the motor/generator 148 is connected to the sun gear 136 of the second planetary gear set 132. However, the motor/generators 146, 148 may be connected in different locations within the scope of the present invention.

The ring gear 134 of the second planetary gear set 132 may be selectively grounded to the housing 154, as by a first torque transfer device 162 (CL1). That is, the grounded ring gear 134 is selectively secured against rotation by an operative connection to the non-rotatable housing 154. The ring gear 134 of the second planetary gear set 132 is also selectively connected to the sun gear 124 of the first planetary gear set 120, as by a second torque transfer device 164 (CL2). The first and second torque transfer devices 162 and 164 are employed to assist in the selection of the operational modes of the hybrid transmission 110.

The sun gear 136 of the second planetary gear set 132 is selectively grounded to the transmission housing 154 via the torque transfer device 165 (CL3). The torque transfer device 167 (CL4) is operative as a reverse input clutch in that it selectively connects the input shaft 118 with the ring gear member 122 of the first planetary gear set 120. The carrier 126 of the first planetary gear set 120 is selectively connected with the transmission housing 154 through the clutch 168 (CL5). The torque transfer device 169 (CL6) is operative as an input clutch in that it selectively connects the input shaft 118 with the carrier 126 of the first planetary gear set 120.

Operation of the transmission 110 in a mechanical reverse mode is defined by the clutching chart of FIG. 2b. As shown, the torque transfer devices 164 (CL2), 167 (CL4), and 168 (CL5) are engaged to provide a mechanical reverse mode. In this mode, the carrier 126 is grounded, and the input is connected to the ring gear 122. Accordingly, the sun gear 124 moves to the left as indicated by the corresponding arrow on the sun gear 124 of FIG. 2a. Since the sun gear 124 is connected to the ring gear 134 through the torque transfer device 164 and the ring gear 122 is connected to the sun gear 136 through the interconnecting member 142, the output 114 which is connected to the carrier 140 of the second planetary gear set 132 is caused to move in the reverse direction an amount as indicated by the arrow on the line identified as item 114 in FIG. 2a. In this configuration, no power is transmitted through the motor/generators 146, 148, so a mechanical reverse mode is achieved wherein all output power is derived from the engine 112.

FIG. 2c shows a clutching table for second fixed ratio mode of operation wherein the torque transfer devices 162 (CL1), 164 (CL2) and 169 (CL6) are applied. Accordingly, the input 118 is connected to the carrier 126 of the first planetary gear set 120. The sun gear 124 and ring gear 134 are grounded, and the ring gear 122 is connected to the sun gear 136. As a result, the output 114 from the carrier 140 is caused to move in a forward direction by a fixed amount, which establishes the fixed mechanical ratio.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
   an input member to receive power from an engine;
   an output member;

first and second motor/generators;

first and second differentially geared planetary gear sets each having first, second and third gear members;

said input member not being continuously connected with any member of said planetary gear sets, and said output member being continuously connected to said first member of said second planetary gear set;

said first and second motor/generators each being continuously connected to at least one member of said planetary gear sets;

said first member of said first planetary gear set being continuously connected with said third member of said second planetary gear set;

a first torque transfer device selectively grounding said second member of said second planetary gear set;

a second torque transfer device selectively connecting said second member of said second planetary gear set to said second member of said first planetary gear set;

a third torque transfer device selectively grounding said third member of said second planetary gear set;

a fourth torque transfer device selectively connecting said first member of said first planetary gear set with said input shaft;

a fifth torque transfer device selectively grounding said third member of said first planetary gear set; and a sixth torque transfer device selectively connecting said third member of said first planetary gear set with said input shaft;

wherein said torque transfer devices enable a mechanical-only reverse mode of operation, in addition to a continuously variable range of speed ratios and fixed forward ratio modes of operation.

2. The electrically variable transmission of claim 1, wherein said first, second and third members of said first planetary gear set comprise a carrier, sun gear and ring gear, respectively, and said first, second and third members of said second planetary gear set comprise a carrier, ring gear and sun gear respectively.

3. The electrically variable transmission of claim 1, wherein said first planetary gear set comprises a compound planetary gear set, and said second planetary gear set comprises a simple planetary gear set.

4. The electrically variable transmission of claim 1, wherein said first, second and third members of said first planetary gear set comprise a ring gear, sun gear and carrier, respectively, and said first, second and third members of said second planetary gear set comprise a carrier, ring gear and sun gear respectively.

5. The electrically variable transmission of claim 4, wherein said first and second planetary gear sets comprise simple planetary gear sets.

6. The electrically variable transmission of claim 1, wherein said mechanical-only reverse mode of operation is achieved with the engagement of said second, fourth and fifth torque transfer devices.

7. The electrically variable transmission of claim 1, wherein:
said first motor/generator is continuously connected to said second member of said first planetary gear set, and selectively connected to said second member of said second planetary gear set; and
said second motor/generator is continuously connected with said third member of said second planetary gear set.

8. An electrically variable transmission comprising:
an input member to receive power from an engine;
an output member;
first and second motor/generators;
first and second differentially geared planetary gear sets each having a sun gear, a carrier and a ring gear;

said input member not being continuously connected with any member of said planetary gear sets, and said output member being continuously connected to said carrier of said second planetary gear set;

said first and second motor/generators each being continuously connected to at least one member of said planetary gear sets;

said carrier of said first planetary gear set being continuously connected with said sun gear of said second planetary gear set;

a first torque transfer device selectively grounding said ring gear of said second planetary gear set;

a second torque transfer device selectively connecting said ring gear of said second planetary gear set to said sun gear of said first planetary gear set;

a third torque transfer device selectively grounding said sun gear of said second planetary gear set;

a fourth torque transfer device selectively connecting said carrier of said first planetary gear set with said input shaft;

a fifth torque transfer device selectively grounding said ring gear of said first planetary gear set; and a sixth torque transfer device selectively connecting said ring gear of said first planetary gear set with said input shaft;

wherein said torque transfer devices enable a mechanical-only reverse mode of operation, in addition to a continuously variable range of speed ratios and fixed forward ratio modes of operation.

9. The electrically variable transmission of claim 8, wherein said first planetary gear set comprises a compound planetary gear set, and said second planetary gear set comprises a simple planetary gear set.

10. The electrically variable transmission of claim 8, wherein:
said first motor/generator is continuously connected to said sun gear of said first planetary gear set, and selectively connected to said ring gear of said second planetary gear set; and
said second motor/generator is continuously connected with said sun gear of said second planetary gear set.

11. The electrically variable transmission of claim 8, wherein said mechanical-only reverse mode of operation is achieved with the engagement of said second, fourth and fifth torque transfer devices.

12. An electrically variable transmission comprising:
an input member to receive power from an engine;
an output member;
first and second motor/generators;
first and second differentially geared planetary gear sets each having a sun gear, a carrier and a ring gear;

said input member not being continuously connected with any member of said planetary gear sets, and said output member being continuously connected to said carrier of said second planetary gear set;

said first and second motor/generators each being continuously connected to at least one member of said planetary gear sets;

said ring gear of said first planetary gear set being continuously connected with said sun gear of said second planetary gear set;

a first torque transfer device selectively grounding said ring gear of said second planetary gear set;

a second torque transfer device selectively connecting said ring gear of said second planetary gear set to said sun gear of said first planetary gear set;

a third torque transfer device selectively grounding said sun gear of said second planetary gear set;

a fourth torque transfer device selectively connecting said ring gear of said first planetary gear set with said input shaft;

a fifth torque transfer device selectively grounding said carrier of said first planetary gear set; and a sixth torque transfer device selectively connecting said carrier of said first planetary gear set with said input shaft;

wherein said torque transfer devices enable a mechanical-only reverse mode of operation, in addition to a continuously variable range of speed ratios and fixed forward ratio modes of operation.

13. The electrically variable transmission of claim 12, wherein said first and second planetary gear sets comprise simple planetary gear sets.

14. The electrically variable transmission of claim 13, wherein:

said first motor/generator is continuously connected to said sun gear of said first planetary gear set, and selectively connected to said ring gear of said second planetary gear set; and said second motor/generator is continuously connected with said sun gear of said second planetary gear set.

15. The electrically variable transmission of claim 14, wherein said mechanical-only reverse mode of operation is achieved with the engagement of said second, fourth and fifth torque transfer devices.

* * * * *